(12) United States Patent
Baumann et al.

(10) Patent No.: US 11,269,585 B2
(45) Date of Patent: Mar. 8, 2022

(54) METHOD AND DEVICE FOR DERIVING AUDIO PARAMETER VALUES FROM AN AES67-COMPATIBLE AUDIO INFORMATION SIGNAL

(71) Applicant: Institut Fur Rundfunktechnik GMBH, Munich (DE)

(72) Inventors: Franz Baumann, Landshut (DE); Felix Renjewski, Munich (DE)

(73) Assignee: Institut Fur Rundfunktechnik GMBH, Munich (DE)

(*) Notice: Subject to any disclaimer, the term of this patent is extended or adjusted under 35 U.S.C. 154(b) by 156 days.

(21) Appl. No.: 16/630,089

(22) PCT Filed: Jul. 11, 2018

(86) PCT No.: PCT/EP2018/068781
§ 371 (c)(1),
(2) Date: Jan. 10, 2020

(87) PCT Pub. No.: WO2019/011981
PCT Pub. Date: Jan. 17, 2019

(65) Prior Publication Data
US 2020/0218499 A1 Jul. 9, 2020

(30) Foreign Application Priority Data
Jul. 11, 2017 (IT) .................. 102017000078297

(51) Int. Cl.
*H04J 3/00* (2006.01)
*G06F 3/16* (2006.01)
(Continued)

(52) U.S. Cl.
CPC ............ *G06F 3/162* (2013.01); *H04L 65/608* (2013.01); *H04L 69/22* (2013.01)

(58) Field of Classification Search
CPC ........ G06F 3/162; H04L 65/608; H04L 69/22
(Continued)

(56) References Cited

U.S. PATENT DOCUMENTS

2004/0213204 A1   10/2004  Yang
2018/0109441 A1*  4/2018  Meyer .................... H04L 45/22

FOREIGN PATENT DOCUMENTS

KR   10-0776408        11/2007
WO   2004/019572 A1    3/2004

OTHER PUBLICATIONS

Sacks et al. "Introduction to AES67 & How to get it into your Products". NAB/Media Networking Alliance. Apr. 12, 2015. pp. 1-91. (Year: 2015).*

(Continued)

*Primary Examiner* — Imad Hussain
(74) *Attorney, Agent, or Firm* — Workman Nydegger

(57) ABSTRACT

A method and a device are provided for deriving audio parameter values from an AES67-compatible audio information signal, which AES67-compatible audio information signal is generated from a serial data stream of successive IP packets (IP(i)), the IP packets containing an IP header (IP HDR), a UDP header (UDP HDR), an RTP header (RTP HDR) and a data field (DATA), and wherein audio parameter values such as sampling frequency and number of channels are derived from information stored in the headers.

15 Claims, 5 Drawing Sheets

(51) Int. Cl.
*H04L 65/65* (2022.01)
*H04L 69/22* (2022.01)

(58) Field of Classification Search
USPC .......................................... 370/476
See application file for complete search history.

(56) References Cited

OTHER PUBLICATIONS

Bebbington. "Open Standards in Pro Audio: AES67". Focusrite/FOSDEM. Feb. 4, 2017. pp. 1-29. (Year: 2017).*
Schmidt, Florian et al. "A Heuristic Header Error Recovery Scheme for RTP" from 2013 10th Annual Conference on Wireless On-demand Network Systems and Services (WONS). Mar. 2013. IEEE. pp. 1-5. (Year: 2013).*
International Search Report dated Sep. 18, 2018, issued in PCT Application No. PCT/EP2018/068781, filed on Jul. 11, 2018.
Written Opinion dated Sep. 18, 2018, issued in PCT Application No. PCT/EP2018/068781, filed on Jul. 11, 2018.
International Preliminary Report on Patentability dated Jan. 14, 2020, issued in PCT Application No. PCT/EP2018/068781, filed on Jul. 11, 2018.
Italian Search Report dated Feb. 7, 2018, issued in Italian Application No. 102017000078297.
Florian Schmidt et al., A Heuristic Header Error Recovery Scheme for RTP, 2013 $10^{th}$ Annual Conference on Wireless On-Demand Network Systems and Services (WONS), pp. 186-190.
Korean Office Action dated Feb. 25, 2021, issued in KR Application No. 10-2020-7002068.

* cited by examiner

```
v=0
o=- 1311738121 1311738121 IN IP4 192.168.1.1
s=Stage left I/O
c=IN IP4 239.0.0.1/32
t=0 0
m=audio 5004 RTP/AVP 96
i=Channels 1-8
a=rtpmap:96 L24/48000/8
a=recvonly
a=ptime:1
a=ts-refclk:ptp=IEEE1588-2008:39-A7-94-FF-FE-07-CB-D0:domain-nmbr=0
a=mediaclk:direct=963214424
```

FIG. 2

METHOD AND DEVICE FOR DERIVING AUDIO PARAMETER VALUES FROM AN AES67-COMPATIBLE AUDIO INFORMATION SIGNAL

BACKGROUND OF THE INVENTION

The invention relates to a method and a device for deriving audio parameter values from an AES67-compatible audio information signal. Such an information signal, which is specified in the AES67 audio standard, is generated from successive IP packets and transmitted as a pure bitstream (audio over IP or audio over ethernet).

With the transmission of audio information over IP, as has been standardized in AES67, in live IP productions, there is also a changeover from circuit-switched to packet-switched networks. In order to guarantee an error-free function, it is particularly important that the streams are transmitted correctly in the network.

BRIEF DESCRIPTION OF THE INVENTION

The object of the invention is to significantly improve the transmission of data in the network. The method according to the preamble of claim 1 is heretofore characterized according to the characterizing measures of claim 1. In the same way, the device according to the invention is characterized according to the features of the eleventh claim.

The invention dwells on the following knowledge.

If the above-specified correct switching of the streams is not implemented in the network, the fault would be found if the network administrator knew the properties of the information signal which is received over the network.

So far, however, the network administrator is not able to obtain information about the streams from the data which is provided by the network. This is because the IP packets only contain the user data and all configuration data is transmitted via another channel.

The measures according to the invention nevertheless enable the network administrator to derive audio parameter values, such as the sampling frequency and the number of audio channels, from the received IP packets. First, the number of samples per channel which are contained in an RTP packet is derived, in accordance with claims 1 and 2.

Thereafter, the sampling frequency can be derived, in accordance with claim 3. Or, the number of channels is derived, in accordance with claim 4.

Another possibility would be to record data in the checksum field of the UDP headers in the audio information signal about the content of the audio information signal and then to derive this data from the UDP headers instead of or in combination with the above-mentioned measures, in accordance with the characterizing feature of claim 5. This can be data as defined in claims 6 to 10. This has the advantage that additional information about the type of stream is nevertheless transmitted with the streams, without reducing the number of payload bits.

BRIEF DESCRIPTION OF THE FIGURES

The invention is further detailed in the description of the figures. Therein,

FIG. 2 shows the structure of a 'Multicast Session description' file.

DETAILED DESCRIPTION OF THE FIGURES

Figure 1:
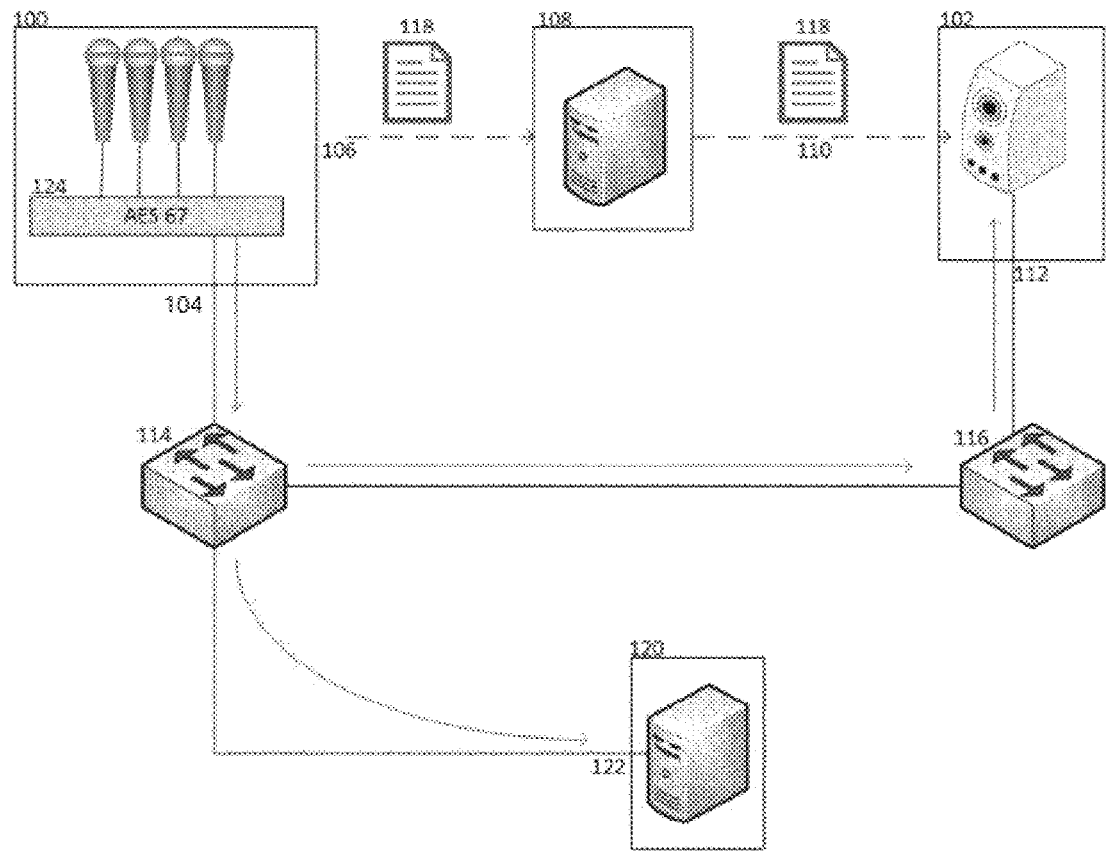
FIG. 1 shows a system, wherein an audio recording of a live production is converted into an AES67-compatible audio information signal and transmitted over the Internet to a remote processing studio, and a network administration unit is provided for monitoring the data which is transmitted over the Internet.

FIG. 1 shows an exemplary embodiment of a system in which an audio recording of a live production takes place, the recorded audio information signal is converted into an AES67-compatible audio information signal and is then transmitted over the Internet to a remote processing studio or a remote sound control room.

FIG. 1 shows a recording studio, indicated schematically by reference number 100, in which an audio recording of a live production takes place. A processing studio 104 is provided which is normally remote from the recording studio. In this example, the recording is carried out in the recording studio 100 by means of four microphones, which are positioned, for example, front left, front right, rear left and rear right in the recording studio. The recorded (here four-channel) audio information signal is converted in a conversion unit 124 into an AES67-compatible audio information signal. The conversion takes place in accordance with the conditions specified in the AES67 standard specification (e.g. AES67-2015: AES standard for audio applications of networks—High performance streaming audio-over-IP interoperability) in a transmission signal that can be transmitted over the Internet. The AES-compatible audio information signal is available at an output 104 which is connected to the Internet.

The AES67-compatible audio information signal is generated from successive IP packets which contain the samples of the audio information signal in the (in this example: four) channels. However, the AES67-compatible audio information signal as available at output 104 does not contain any information about the audio-specific parameter values of the audio information signal, such as the sampling frequency and the number of transmitted audio channels, which are contained in the audio information signal to be transmitted. The AES67 specification provides a so-called 'Multicast Session description' file 118 which contains information about these audio-specific parameters. The file is provided at an output 106 and fed via the Internet to a server 108 and stored there.

The file 118 also contains, inter alia, the source address of the recording studio 100 such that the output 104 can be identified over the Internet.

If a sound technician in the sound control room 102 wants to receive the audio recording of the live program for further processing of the audio information signal so that it can be provided as a broadcast transmission signal to one or more transmitters, she/he gets the 'Multicast Session description' file 118 from the server 108 via the Internet, see the communication over the connection 110 between sound control room 102 and server 108 in FIG. 1.

FIG. 2 shows an example of a 'Multicast Session description' file 118, as is also described in chapter 8.5.1 of the AES67-2015 standard specification.

Parameter c in the file specifies the source address (in this example IP4 239.0.0.1732), parameter i the number of audio channels (in this example 8) and the sampling frequency (in this example 48 kHz) can be seen below.

With this information, the sound engineer can receive the AES67-compatible audio information signal. The transmission of the AES67-compatible audio information signal from output 104 of the recording studio 100 over the Internet to an input 112 of the sound control room 102 takes place in FIG. 1 via the switches 114 and 116.

Figure 3:
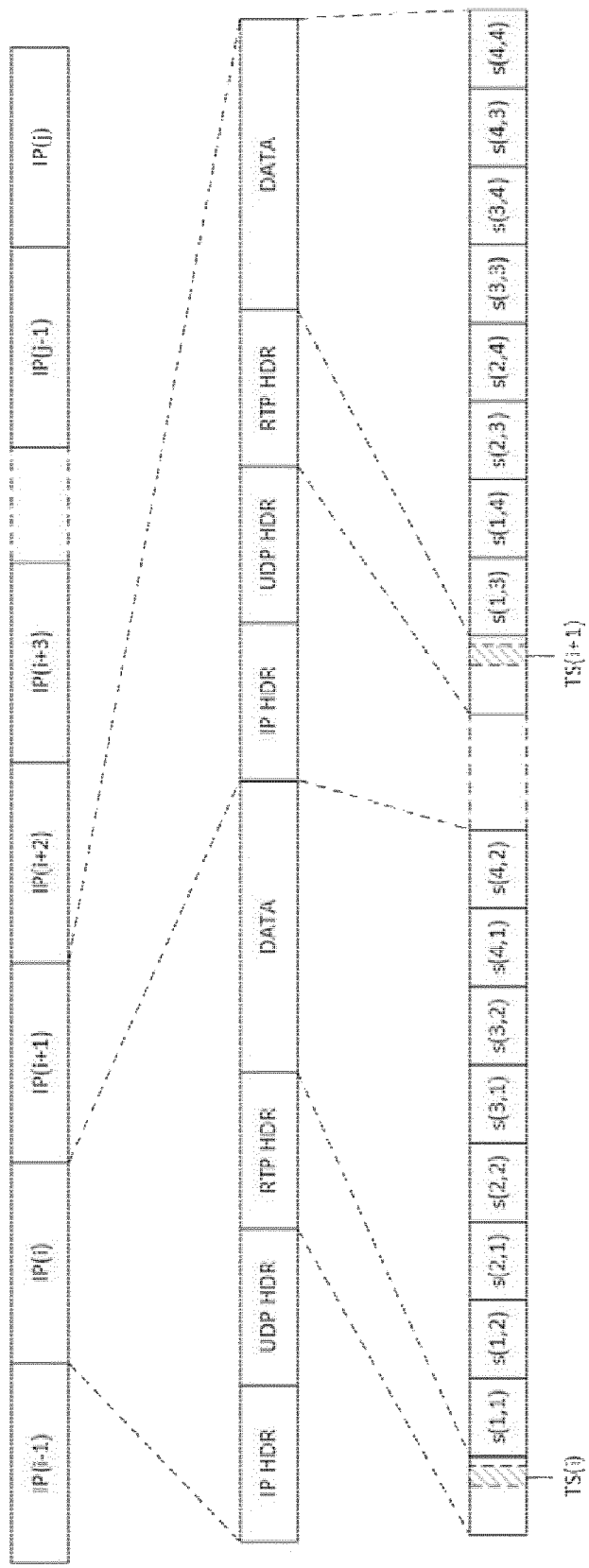
FIG. 3 shows the structure of an AES67-compatible audio information signal.

FIG. 3 shows the structure of an AES67-compatible audio information signal that is provided via the Internet, switches 114 and 116, to the input 112 of the sound control room 102. The AES67 compatible audio information signal is made up of successive IP packets . . . IP (i), IP (i+1), IP (i+2), . . . . An IP packet contains an IP header IP-HDR, a UDP header UDP HDR, an RTP header RTP HDR, and a data field DATA. The AES67-compatible audio information signal can now be transmitted to the sound control room 102 and processed there.

What can possibly still happen is that a faulty transmission of data can occur between the output 104 of the recording studio 100 and the input 112 of the processing studio/sound control room 102.

For once, the sound engineer may have downloaded an incorrect 'Multicast Session description' file 118 from server 108. Or it may be that there is no 'Multicast Session description' file.

In order to eliminate such transmission problems, a network administration unit 120 is provided for monitoring the data which is transmitted over the Internet. To this end, this network administration unit 120 is in this case coupled to the network via the switch 114 and is configured to receive all AES67-compatible information signals from the recording studio 100.

Because the AES67-compatible audio information signal, as already stated above, does not contain any information about the audio-specific parameter values of the audio information signal, such as, for example, the sampling frequency and the number of transmitted audio channels, which are contained in the to-be-transmitted audio information signal, it is not possible for the network administration unit 120 to derive these audio-specific parameter values directly from the AES67-compatible audio information signal.

In accordance with the invention, some suggestions are now described which make it possible to nevertheless derive these audio-specific parameter values from the AES67-compatible audio information signal.

First, the number N of samples per channel, which are contained in the data field DATA of an IP packet, is derived from the AES67-compatible audio information signal. This is achieved as follows. FIG. 3 shows that there is a time stamp field TS(i) in the RTP header of the IP packet IP(i) and a time stamp field TS(i+1) in the RTP header of the IP packet IP(i+1). The network administration unit 120 derives the timestamp values TS(i) and TS(i+1) of these successive IP packets from the RTP headers of these packets. Then, N is derived by subtracting: TS(i+1)−TS(i)=N. As an example: TS(i)=n and TS(i+1)=n+2. This means that the data field DATA of the IP packets contains (n+2−n=) two samples per channel.

Another possibility of deriving the number N of samples per channel contained in a data field of an IP packet is as follows. The time stamps TS(i) and TS(j) are derived from the RTP headers of the IP packets IP(i) and IP(j). N is calculated as follows:

$$N=\{TS(j)-TS(i)\}/(p+1),$$

where p is equal to the number of IP packets between the two IP packets (IP(i), IP(j)) in the serial data stream, p being an integer greater than or equal to zero.

FIG. 3 shows an example of the content of the data field of the IP packet IP(i). It contains two samples s(1,1), s(1,2) of a first channel, then two samples s(2,1), s(2,2) of a second channel, then two samples s(3,1), s(3,2) of a third channel, and then two samples s(4,1), s(4,2) of a fourth channel. The data field DATA of the IP packet IP(i+1) contains eight samples: two samples s(1,3), s(1,4) of the first channel, then two samples s(2,3), s(2,4) of the second channel, then two samples s(3,3), s(3,4) of the third channel, and then two samples s(4,3), s(4,4) of the fourth channel.

Figure 5:
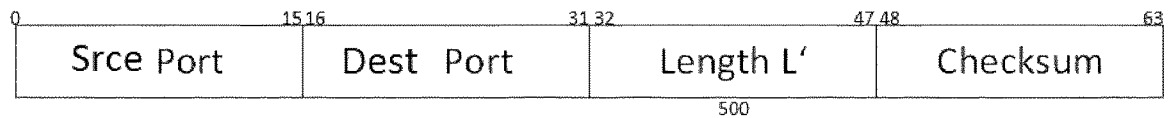
FIG. 5 shows the structure of a UDP header.

In order to derive the number of channels which are transmitted in the AES67-compatible audio information signal, a value L' is derived from the UDP header UDP HDR, as in FIG. 5. This value L' specifies the length of the RTP packet (which is equal to the length of the RTP header and the data field DATA) expressed in bytes. Because the length of the RTP header RTP HDR is defined by default, the length L of the data field DATA thus can be derived from L'. Now, the number of channels is given by: L/N', where N'=N·p, and p is the length of a sample, expressed in the number of bytes. p is also defined by default and is, for example, equal to 3 bytes.

To derive the sampling frequency, it is determined how many IP packets M are received in a specific time interval T. The sampling frequency can then be calculated as equal to N·M/T. M can be derived in different ways. First, M could be derived by counting the number of IP packets received in the given time interval. Second, one could also derive the sequence number of the first IP packet and the last IP packet that is received in the time interval and then calculate M by subtracting the two values. These sequence numbers are stored in the RTP header.

The network administrator can then pass this desired information to the sound engineer so that the transmitted AES67b compatible audio information signal can be received and decoded. Because the network administrator receives all information signals from the recording studio, as stated above, the network administrator can also derive the source address from the IP header of the AES-compatible audio information signal and forward it to the sound engineer.

Figure 4:
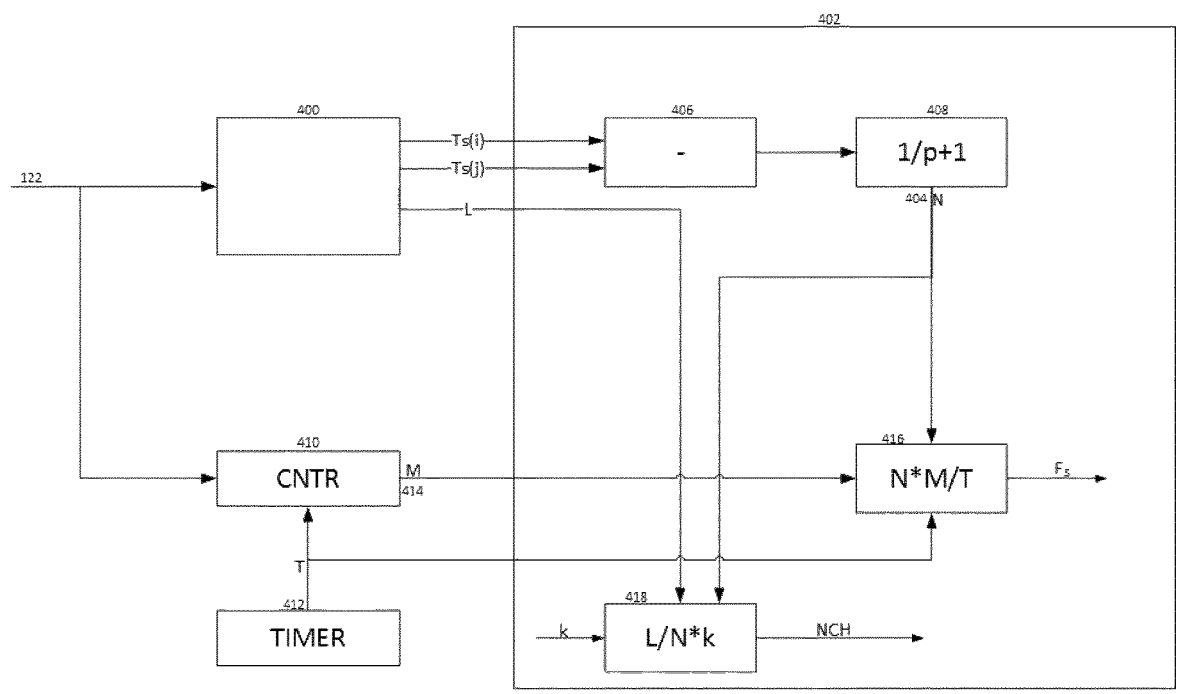
FIG. 4 shows a first exemplary embodiment of a device for deriving audio parameter values from the AES67-compatible audio information signal.

FIG. 4 shows a first exemplary embodiment of a device for deriving audio parameter values from the AES67-compatible audio information signal. The device includes an input 122 for receiving the AES67-compatible audio information signal. The device is provided with a derivation unit 400 for deriving information, in this example for deriving timestamps TS(i) and TS(j), of at least two RTP headers from at least two IP packets in the serial data stream of the AES67 which are output at two outputs and fed to inputs of a calculation unit 402.

The number of channels N is calculated in the calculation unit 402 according to the following formula:

$$N=\{TS(j)-TS(i)\}/(p+1)$$

where TS(i) and TS(j) are equal to the values of the two derived timestamps and p is the number of IP packets between the two IP packets (IP(i), IP(j)) in the serial data stream, where p is an integer greater than or equal to zero.

This means that the calculation unit contains a subtraction unit 406 for subtracting the two timestamp values from one another and a dividing unit 408 for dividing the result of the subtraction unit 406 by p+1.

The value N is then available at the output 404 of the dividing unit 404.

To derive the sampling frequency Fs, the device contains a counting unit 410 and a timer unit 412. The timer unit 412 determines a time interval T, and within this time interval T the counting unit counts the number M of IP packets which are received at the input 122 within this time interval T. The value M is available at the output 414 of the counter unit 410 and is provided to the calculation unit 402. The value of the time interval T is also fed to the calculation unit 402. The calculation unit 402 contains a sampling frequency calculation unit 416, which receives the values N, M and T and derives the sampling frequency Fs therefrom, according to the formula: Fs=N M/T.

As already stated above, the unit 410 could instead be configured as a counting unit for reading out the sequence number of the first and last IP packet which is received within this time interval T. The unit could then then subtract the two sequence numbers from one another to derive the value M.

The derivation unit 400 is further configured to derive a length L expressed in bytes of the data field of the IP packet, from the UDP header. A value L' is stored in the length field 500 of a UDP header, as shown in FIG. 5. This value L' corresponds to the length of the RTP packet (that is, the length of the RTP header RTP HDR and the data field DATA, see FIG. 3). Since the length of the RTP header is known, the length L of the data field DATA can thus be derived. This value L is also fed to the calculation unit 402. A calculation is carried out in the calculation unit 402 in block 418, wherein the number of channels NCH is calculated according to the following formula:

$$NCH=L/N \cdot k$$

where k is the length of a sample expressed in number of bytes. The AES67 standard specification states that k can be 3.

As already mentioned above, this information can be passed on to the sound engineer so that she/he is able to receive and decode the transmitted AES-compatible audio information signal.

FIG. 5 shows a UDP header as it is contained in the IP packets. The UDP header consists of four fields: a 16-bit source address (SRCE PORT), a 16-bit destination address (DEST PORT), the 16-bit length field L' 500 already described above and a 16-bit CHECKSUM field. The CHECKSUM field is intended to identify and, if necessary, correct bit errors in the UDP header, in the RTP header and in the DATA data field. In other protocols, this is used to request retransmission of an incorrectly transmitted packet again. However, as this is not envisaged for UDP, the CHECKSUM field is often set to 'null', which means that it is not used.

According to the invention, it is proposed to use the CHECKSUM field of the UDP header to transmit information data to a media stream. Data could be stored in the CHECKSUM field that further identifies the to-be-transmitted information signal. This could be done in case of an AES67-compatible information signal, for instance, but could also be feasible when transmitting other information signals over a network.

The coding in the 16 bits available in the CHECKSUM field could look as follows:

Bits 0, 1 (bits 48 and 49 in FIG. 5): transmission type such as AES67, TR01, TR03 and SMPTE2110, where Tr stands for Technical Recommendation.

Bits 2, 3 (bits 50 and 51 in FIG. 5): type of data, such as audio, video and metadata.

Bit 4 (bit 52 in FIG. 5): compressed yes/no.

Bit 5, 6 (bits 53 and 54 in FIG. 5): coding type, such as JPEG2000 and TICO (tiny codec).

Figure 6:
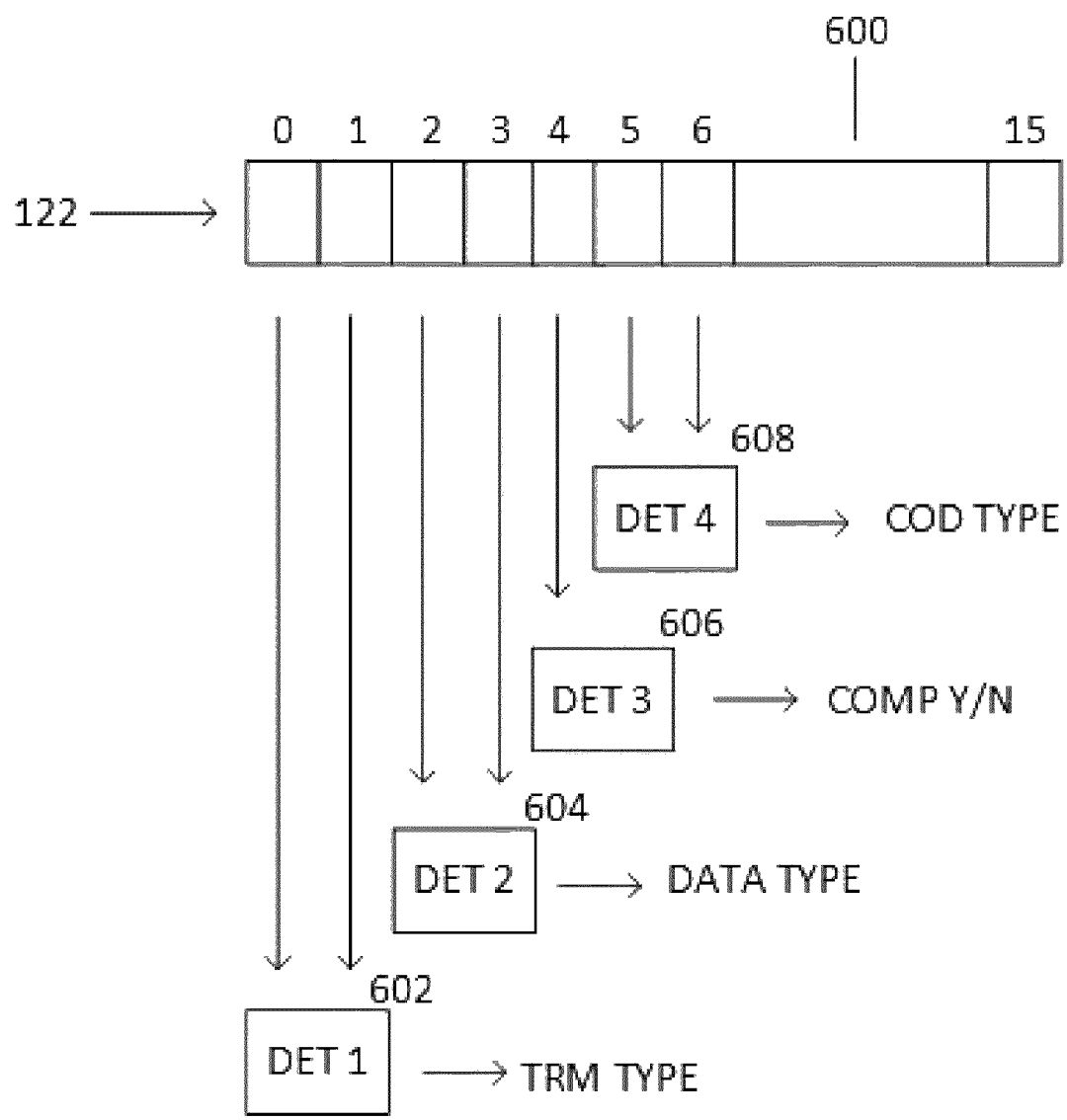
FIG. 6 shows a second exemplary embodiment of a device for deriving audio parameter values from the AES67-compatible audio information signal.

FIG. 6 shows an exemplary embodiment of a device for receiving an AES67-compatible information signal, which is provided at an input 122. This device contains a 16-bit shift register 600 for storing the content of the 16-bit CHECKSUM field of a UDP header. Outputs of the memory locations of bits 0 and 1 (bits 48 and 49 in FIG. 5) are fed to a first detection unit 602. The detection unit 602 derives the transmission type TRM TYPE from the bit values of bits 0 and 1. Outputs of the memory locations of bits 2 and 3 are fed to a second detection unit 604. The detection unit 604 derives from the bit values of bits 2 and 3 (bits 50 and 51 in FIG. 5) the type of data DATA TYPE to be transmitted. The output of the memory location of bit 4 is fed to a third detection unit 606. The detection unit 606 derives from the bit value of bit 4 (bit 52 in FIG. 5) whether the information signal has been compressed or not COMP Y/N. Outputs of the memory locations of bits 5 and 6 are fed to a fourth detection unit 608. The detection unit 608 derives the coding type COD TYPE from the bit values of bits 5 and 6 (bits 53 and 54 in FIG. 5).

Device for deriving signal-specific identifiers from a serial data stream, which serial data stream is constructed from successive IP packets, the IP packets containing an IP header, a UDP header, an RTP header and a data field, the device comprising an input for receiving the serial data stream, a checksum field being present in the UDP header in the IP packets of the serial data stream, in which indicators are stored about the content of the serial data stream to be transmitted, the device being provided with a derivation unit to derive these indicators from the checksum field of an IP packet.

These indicators can indicate the content of the data transmission signal, the transmission type and/or the type of data transmission signal and/or the type of compression and/or the type of coding. At least two bits of the checksum field, preferably the first two (bits 0, 1), can indicate the following transmission types: AES67, Tr01, Tr03 and SMPTE2110.

Or at least two bits of the checksum field, preferably the second two bits (bits 2, 3), can specify the following types of data in the data transmission signal: audio, video and metadata.

Or, at least one bit of the checksum field, preferably the fifth bit (bit 4), could indicate the following types of compression: compressed and uncompressed. Or, at least two bits of the checksum field, preferably the sixth and seventh bit (bits 5, 6), could indicate the following types of coding: JPEG2000 and TICO. The device could then look exactly like the device in FIG. 6.

The invention claimed is:

1. A method implemented at a hardware device for deriving audio parameter values from an AES67-compatible audio information signal which is generated as an AES67-compatible audio information signal from a serial data stream of successive IP packets, each IP packet comprising an IP header, a UDP header, an RTP header and a data field, the method comprising:

receiving the successive IP packets from an audio recorder; extracting a first RTP header from a first IP packet of the successive IP packets;

extracting a second RTP header from a second IP packet of the successive IP packets;

deriving a number N of samples per channel that are contained in the data field of each IP packet based on the first RTP header and the second RTP header; and sending the derived number N to an audio receiver that is configured to receive the AES67-compatible audio information signal and a multicast session description file from the audio recorder, causing the audio receiver to:

compare the derived number N with data contained in the multicast session description file to determine whether the derived number N is inconsistent with the data contained in the multicast session description file; and in response to determining that the derived number N is inconsistent with the data contained in the multicast session description file, determine that faulty transmission of data has occurred.

2. The method of claim 1, wherein a time stamp is derived from the RTP header of each of two IP packets in the serial data stream, and the value N is calculated using the formula N={TS(j)−TS(i)}/(p+1), where TS(i) and TS(j) are the values of the two derived timestamps and p is the number of IP packets between said two IP packets (IP(i), IP(j)) in the serial data stream, where p is an integer greater than or equal to zero.

3. The method of claim 1, wherein the method further includes measuring how many IP packets M are received in a certain time interval T, and deriving a sampling frequency by computing N.M/T.

4. The method of claim 1, wherein in order to derive the number of channels, a length L, expressed in bytes of the data field of the IP packet, is first derived from a UDP header, and the number of channels is L/N', where N' is N.k, and k is the length of a sample, expressed in number of bytes.

5. The method of claim 1, wherein there is a checksum field in the UDP header in the AES67-compatible audio information signal, in which checksum field there is stored data about the content of the information signal to be transmitted and in which data is derived from the AES67 compatible audio information signal.

6. The method of claim 5, wherein the data about the content of the audio information signal indicates the type of transmission and/or the type of data to be transmitted in the information signal and/or the type of compression and/or the type of coding.

7. The method of claim 6, wherein at least two bits indicate the following transmission types: AES67, Tr01, Tr03 and SMPTE2110.

8. The method of claim 6, wherein at least two bits indicate the following types of data in the information signal to be transmitted: audio, video and metadata.

9. The method of claim 6, wherein at least one bit specifies the following types of compression: compressed and uncompressed.

10. The method of claim 6, wherein at least two bits indicate the following types of coding: JPEG2000 and TICO.

11. A hardware device for deriving audio parameter values from an AES67-compatible audio information signal, which is generated as an AES67-compatible audio information signal from a serial data stream of successive IP packets, the IP packets comprising an IP header, a UDP header, an RTP header and a data field, the hardware device being configured to:

receive the successive IP packets from an audio recorder;

extract a first RTP header from a first IP packet of the successive IP packets;

extract a second RTP header from a second IP packet of the successive IP packets;

derive a number N of samples per channel that are contained in the data field of each IP packet based on the first RTP header and the second RTP header; and send the derived number N to an audio receiver that is configured to receive the AES67-compatible audio information signal and a multicast session description file from the audio recorder, causing the audio receiver to:

compare the derived number N with data contained in the multicast session description file to determine whether the derived number N is inconsistent with the data contained in the multicast session description file; and in response to determining that the derived number N is inconsistent with the data contained in the multicast session description file, determine that faulty transmission of data has occurred.

12. The hardware device of claim 11, wherein the hardware device is further configured to derive time stamps from the RTP headers of two IP packets in the serial data stream, and calculate N according to the following formula:

$$N=\{TS(j)-TS(i)\}/(p+1),$$

where TS(i) and TS(j) are equal to the values of the two derived timestamps and p is the number of IP packets between the two IP packets (IP(i), IP(j)) in the serial data stream, where p is an integer greater than or equal to zero.

13. The hardware device of claim 11, wherein the hardware device is further configured to determine a number M of IP packets received within a specific time interval T, and perform a calculation N.M/T whose result is equal to a sampling frequency.

14. The hardware device of claim 11, wherein hardware device is further configured to derive a length L, expressed in bytes, of the data field of the IP packet from the UDP header, and execute a calculation L/N', where N' is equal to N.k, and k is a number of bytes of a sample, whose result is the number of channels.

15. The hardware device of claim 11, wherein a checksum field is present in the UDP header in the AES67-compatible audio information signal, in which checksum field data about the content of the audio information signal is stored, and the device is further provided with a derivation unit for deriving the data stored in the checksum field.

* * * * *